R. F. PHILLIPS & L. J. McCLOSKEY.
MINE CAR WHEEL.
APPLICATION FILED MAR. 4, 1912.

1,026,454.

Patented May 14, 1912.

WITNESSES

Robert T. Phillips
and Louis J. McCloskey
INVENTORS

Attorneys

UNITED STATES PATENT OFFICE.

ROBERT F. PHILLIPS AND LOUIS J. McCLOSKEY, OF CARRICK BOROUGH, PENNSYLVANIA, ASSIGNORS TO PHILLIPS MINE AND MILL SUPPLY CO., OF PITTSBURGH, PENNSYLVANIA, A CORPORATION OF PENNSYLVANIA.

MINE-CAR WHEEL.

1,026,454.

Specification of Letters Patent. Patented May 14, 1912.

Application filed March 4, 1912. Serial No. 681,530.

*To all whom it may concern:*

Be it known that we, ROBERT F. PHILLIPS and LOUIS J. McCLOSKEY, citizens of the United States, residing at Carrick Borough, in the county of Allegheny and State of Pennsylvania, have invented certain new and useful Improvements in Mine-Car Wheels, of which the following is a specification, reference being had therein to the accompanying drawing.

This invention has relation to mine car wheels of that class wherein a stationary axle and rotating wheel are employed and the object of this invention is to provide novel means for preventing wear of the linch pin, which secures the wheel on the axle.

In the ordinary construction a flat washer is interposed between the rotating wheel and the linch pin and this washer rotates with the wheel and soon wears out the linch pin so that it is liable to break and allow the wheel to come off the axle.

In our invention we form the washer with projecting lugs that engage the linch pin and prevent the washer from rotating with the wheel, whereby all wear is imposed on the inside of the washer, thus protecting the linch pin and preventing it from being worn out.

Figure 1:
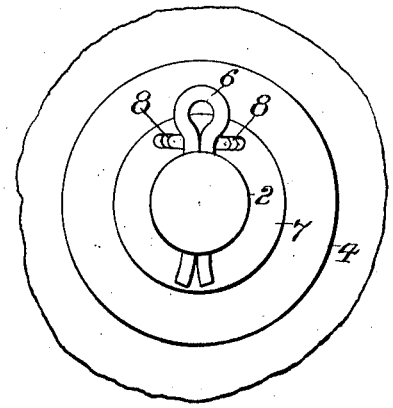
Figure 2:
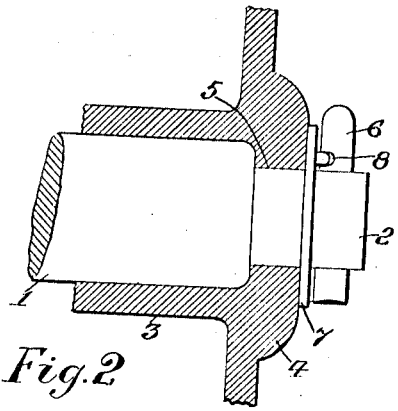
Figure 3:
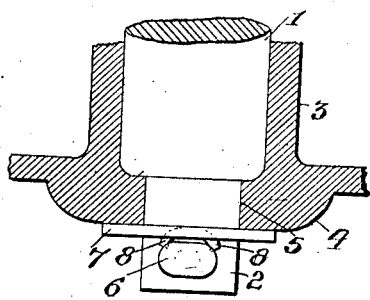
Figure 4:
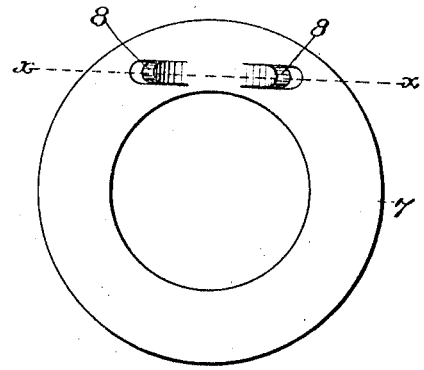
Figure 5:

We have illustrated our invention in the accompanying drawing wherein:

Figure 1 is a side elevation of part of a wheel with our improvement thereto. Fig. 2 is an elevation of the parts shown in Fig. 1, taken at right angles to Fig. 1, the fragmentary portion of the wheel shown in this figure being in section. Fig. 3 is a plan view of the parts shown in Figs. 1 and 2, the portion of the wheel shown being also in section. Fig. 4 is a front elevation on an enlarged scale, of the washer shown in the above named figures, and Fig. 5, is a sectional view of the washer on the line $x$—$x$ of Fig. 4.

The wheel and axle, of which a portion are shown in the drawing, are of that type in which the end of the axle is reduced in size and projects through an opening in a cap formed integral with the hub of the wheel, but our invention can be employed equally as well with wheels of the ordinary type in which the end of the axle, on which the wheel turns, is of uniform diameter.

The axle is designated 1, and is formed with the reduced outer end portion 2. The axle 1, is a fixed axle, being secured to the car, and the wheel rotates thereon. The hub portion 3, of the wheel shown in the drawing, is formed with the integral cap 4, having the central opening 5, through which projects the reduced outer end portion 2, of the axle 1. The linch pin, designated 6, is shown in the form of a cotter pin, that is a section of half round metal doubled on itself and having its ends spread apart to retain it in position in the hole in the axle through which it passes, but we wish it to be understood that a straight or tapering solid linch pin may be employed if desired.

A washer 7 is arranged on the axle between the linch pin and the wheel and this washer is formed with integral lugs 8, on its outer side, these lugs being at such distance apart as to receive the linch pin 6, between them and their purpose is to prevent the washer from rotating and thus imposing wear on the linch pin.

The washer is shown separately in Figs. 4 and 5, and is preferably composed of comparatively soft metal, such as wrought iron or steel and the lugs 8, 8, are preferably formed by upsetting or punching outwardly a part of the material of which the washer is composed, so as to form the lugs integral with and upset or punched from the body of the washer. These lugs closely embrace and fit partly around the linch pin and serve to hold the washer and linch pin in relatively fixed position and thus prevent wear of the linch pin, all wear being imposed on the inner surface of the washer.

When the washer becomes worn the linch pin can be removed and the worn washer can be readily removed and replaced.

We claim:

The combination with a wheel, an axle, a malleable washer arranged on the axle and a linch pin passing through the axle, the washer being provided with integral lugs bent outwardly to engage both sides of the linch pin.

In testimony whereof we affix our signatures in presence of two witnesses.

ROBERT F. PHILLIPS.
LOUIS J. McCLOSKEY.

Witnesses:
D. A. BECK,
FRANK L. FLEMING.